United States Patent Office 3,679,473
Patented July 25, 1972

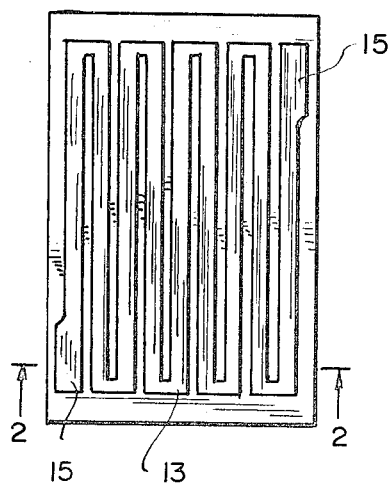
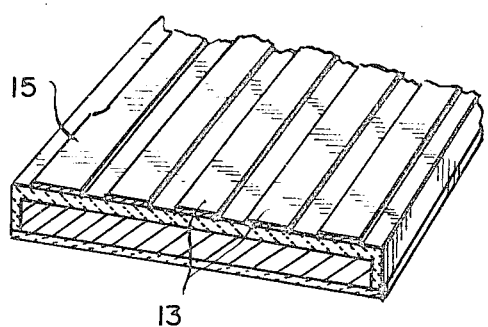
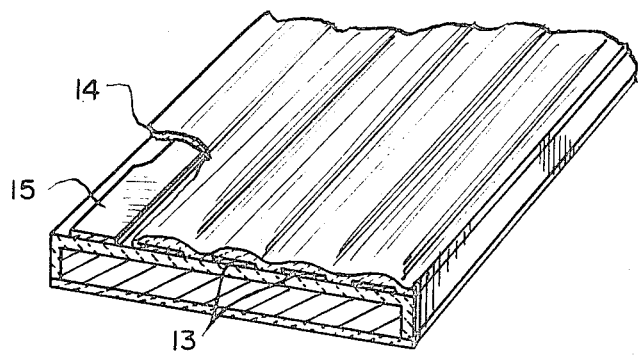
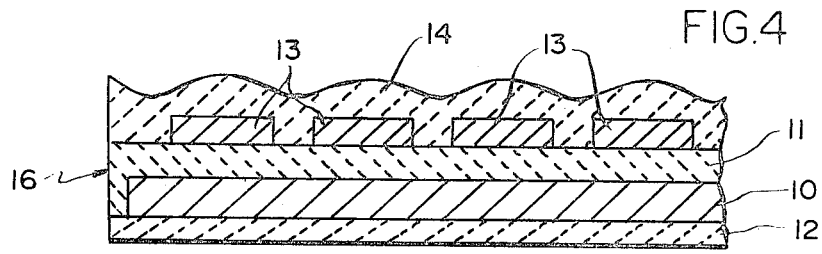

3,679,473
METHOD OF MAKING A HEATING ELEMENT
John K. Blatchford, St. Joseph, Edward C. Peterson, Benton Harbor, and Jan C. Burda, Eau Claire, Mich., assignors to Whirlpool Corporation
Filed Dec. 23, 1970, Ser. No. 100,875
Int. Cl. B44d 1/18
U.S. Cl. 117—212
12 Claims

ABSTRACT OF THE DISCLOSURE

A method of making a heating element such as a heated panel for a cooking oven comprising applying to a heat resistant base such as a metal panel a fired vitreous ceramic first coating, then applying over this first coating a fired vitreous ceramic second coating containing dispersed metal particles in electrical conducting contact with each other formed in said second coating by chemical reduction of a metal compound therein, and then, preferably, applying over this second coating a fired vitreous ceramic protective coating with the result that the second coating comprises an electrical conducting resistant heating layer that is protected by the ceramic protective coating.

---

One of the features of this invention is to provide a method of making an improved heating element in which the heating member comprises a ceramic layer that is electrically conducting to function as a resistance heating element and comprising dispersed metal particles on a heat resistant support base, the metal particles being formed in situ as a result of chemical reduction of a metal compound.

Other features and advantages of the invention will be apparent from the following description of certain embodiments thereof taken in conjunction with the accompanying drawings. Of the drawings:

FIG. 1 is a plan view of a heating element embodying the invention and shown in an early stage of its production.

FIG. 2 is an enlarged perspective view taken along line 2—2 of FIG. 1.

FIG. 3 is a view similar to FIG. 2 but showing a further stage in the manufacture of the panel.

FIG. 4 is a fragmentary vertical sectional view through the completed panel.

The method of making a heating element embodying the invention as shown in the accompanying drawings comprises in this embodiment providing a heat resistance base 10 which can be a sheet metal panel and coating both sides of this base with a first coating 11 and 12 of a fired on porcelain or other ceramic coating. The heat resistance base could be ceramic instead of metal provided it was strong enough for the intended application. Coatings 11 and 12 may be produced through repeated applications of ceramic until a desired thickness is obtained.

Next over one of these first coatings 11 there is applied as by silk screening or by masking and spraying a second coating 13 here shown in a continuous serpentine strip of a vitreous ceramic second coating containing a reducible metal compound and a reducing agent therefor. The ceramic used in coating 13 may be, but is not necessarily, the same as that used in coating 11; but must be compatible with it. Upon again firing to fuse the second coating ceramic the metal compound is reduced at the firing temperature to produce a finely dispersed network of metallic particles embedded in the ceramic strip 13.

The appearance of a typical panel at this stage of the preparation is shown in FIGS. 1 and 2.

Then, in the preferred structure, there is applied over the second coating strip 13 a ceramic protective coating 14 and the panel is again fired to fuse the ceramic of this layer 14 which need not be the same material as used in layers 11, 12 and 13 but which must be compatible with layers 11 and 13.

A ceramic precursor for mixture with a metal compound and useable in the formulation of layer 13 is a Chicago Vitreous Corporation enamel slip having the following formula:

| Material: | Amount |
|---|---|
| 821M frit | 25 lbs. |
| 1041 frit | 28 lbs. |
| 1021 frit | 47 lbs. |
| H-clay | 3 lbs. 8 oz. |
| Silica | 16 lbs. |
| X-clay | 3 lbs. 8 oz. |
| Sodium nitrate | 1 oz. |
| Setit-A | 1 oz. |
| Magnesium carbonate | .75 oz. |
| Water | 45 lbs. |

Ground to 5% fines over 200 mesh screen using 100 g. sample. Specific gravity is 1.74.

A typical metal-ceramic composite is formulated from the above ground coat formula by adding 30–60 parts of the metal compound silver oxide to 40–70 parts of the ground coat formula and ball milling the mixture for one hour. Before or after ball milling the mixture, 2–4% by weight of a reducing agent such as sodium hypophosphite is added. The silver oxide metal compound is not electrically conducting prior to being reduced by the reducing agent.

The mixture is then applied in a continuous serpentine strip to the ceramic coated metal panel as shown in FIGS. 1–3 and fired in a furnace for 2–5 minutes at 1500° F. (the firing temperature and time depend upon the particular frit mixture used).

When fired in a furnace to fuse the ceramic the metal compound is reduced to a finely dispersed network of metallic silver particles embedded in the ceramic.

The resultant layer is a uniform grey in appearance and is electrically conductive and can be heated electrically to make heating elements for heating panels and the like.

Other examples of metal-ceramic composite layers which can be used for coating 13 are:

Example 2: 40 g. of carbonyl nickel powder, 60 g. of Chicago Vitreous Corporation base coat slip No. SG–30902–A, and 10 g. sodium hypophosphite $NaH_2PO_2$ are mixed and about 5 ml. of water is added to adjust the flow characteristics of the slip.

Example 3: Nickel powder and chromium powder in the ratio of 4:1 is substituted for nickel powder in Example 2 above.

Example 4: A metal-porcelain slip is prepared by mixing two parts of the slip referred to in Example 2 with one part of slip containing 40% silver oxide.

The metal-ceramic slips described in Examples 2, 3 and 4 above are sprayed on, dried, and fired on the top of base coated steel panels to form ceramic layers containing a network of metal particles which are electrically conductive and which can be heated electrically to provide heating elements. It will be recognized that in Examples 2 and 3, finely divided metals are used rather than metal compounds, and that the reducing agent functions during firing of the ceramic layer to prevent oxidation of the metal or metals in the layer.

Another example is as follows: Seventy two grams of base coat slip Chicago Viterous Corporation No. SL–30902B, 67 g. silver oxide $Ag_2O$, 6.7 g. copper oxide CuO and 20 ml. deionized water is milled overnight in a ball mill. The slip is washed out of the mill with an additional 33 ml. of deionized water. Before spraying, to a weighted quantity of the oxide containing slip is added 10% by weight of sodium hypophosphite NaH₂PO₂. When the hypophosphite has dissolved, the slip is adjusted with water to a suitable consistency for spraying. When fired on a base coat enamel at 1660° F. for about 3 minutes, this gives a grey-green conductive layer capable of being heated electrically. A cover coat of porcelain enamel is applied over the conductive coat leaving exposed areas painted with silver for electrical connections.

A further example is prepared as follows:

| Material: | Amount, Parts |
|---|---|
| Chicago, Viterous Corporation No. 127–5 frit milled to fineness of 0–0.5 g. on 325 mesh, dried and pulverized | 12.8 |
| Silver oxide, $Ag_2O$ | 30.0 |
| Stannous oxide, SnO | 7.2 |

This mixture is ground in a mechanical mortar or ball mill to ensure thorough mixing and then blended with a pine oil based silk screening oil for application before firing.

The blended viscous mixture is applied to a porcelain enameled steel plate in a continuous serpentine path by silk screening. The porcelain enamel is also compounded to exhibit very low electrical conductivity and to be compatible with the metal ceramic composite. After the silk screening oil is driven off in an oven at 200–400° F., the metal ceramic composite is formed on the porcelain enameled steel plate by firing in a furnace at a temperature which fuses the ceramic portion (e.g. 1550° F. for 4 minutes for the example given). After cooling the composite will conduct an electric current and the porcelain enameled steel plate will be heated by passage of the electric current through the metal-ceramic composite.

Other metals may be treated similarly, and metal oxides which can be used include nickel oxide (NiO), cuprous oxide ($Cu_2O$), and cupric oxide (CuO). Also, other reducing agents may be used, as for example sodium borohydride. Metal compounds may also be used for reducing agents as, for example, stannous oxide (SnO).

The nature of the metallic particles within the ceramic martix can be modified by formulation. Thus, for example, if silver nitrate is used in place of silver oxide a different dispersion pattern of the metal particles is produced in the ceramic.

From the examples cited, it will be understood that a number of different porcelain enamel mixtures, reducible metal compounds and reducing agents can be employed to form the electrically conductive layer 13. One preferred mixture utilizes the Chicago Vitreous Corporation porcelain enamel formulation No. 68–S–800 which is in dry powder form. Utilizing this a porcelain slip formulation suitable for silk screening application is obtained. The following mixture is used:

| Material: | Amount |
|---|---|
| Porcelain enamel formulation (Chicago, Vitreous Corporation No. 68–S–800) grams | 18.75 |
| Silver oxide ($Ag_2O$) do | 50.0 |
| Stannous oxide (SnO) do | 14.6 |
| Squeegee oil (Chicago Vitreous Corporation No. 9909) milliliters | 35 |

This mixture is ground with a mechanical mortar and pestle until thoroughly mixed and uniform of texture. The resulting material is then applied to the ceramic coated metal panel in a serpentine pattern utilizing the well known silk screening method. The material is dried in an oven at 250° F. for 30 minutes and then fired for 4 minutes in an oven at 1480–1510° F.

When fired the silver oxide reduces to a dispersed continuous metal network the reduction being aided by the reducing action of the stannous oxide. The resultant layer is uniform in appearance and electrically conductive.

The stannous oxide used as a reducing agent is a preferred reducing agent since it does not itself give off gas during the firing process and can react with the oxygen liberated by the silver oxide during reduction to silver. This consumption of oxygen by the stannous oxide, SnO, with its resultant conversion to stannic oxide, $SnO_2$, helps to prevent the formation of gas bubbles in the final ceramic structure. Those skilled in the art will recognize that certain other metals or metal oxides can also be used as reducing agents for this purpose.

In a preferred embodiment of a completed panel a pair of spaced areas such as the terminal areas 15 of the ceramic strip second coating 13 are left exposed by the protective coating 14 to form areas for attaching electric leads (not shown) in order to direct an electric current through the strip. This electric current flow generates heat by resistance heating in the completed panel 16. Thus the heating element of this invention has good heating characteristics particularly at the portion containing the continuous strip 13. These panels are quite useful wherever electric heating is required. Examples are panels of warming trays, portions of cooking ovens, self-cleaning ovens, electric clothes dryers, space heaters, heated utensils, water heaters, radiant wall heating panels, and so forth.

The use of the electrically conductive material is not limited to heating applications. It is a characteristic of the conducting material that an increase of electrical resistance of the material occurs with increases in temperature. This change in resistance with temperature allows the material to be used as a variable resistance element from which, utilizing suitable electrical techniques, the temperature of the body to which it is attached can be determined. The material therefore can be used to determine the temperature of a body either separately, or in joint function with its use as a heating element.

Having described our invention as related to the embodiment disclosed in the accompanying drawings, it is our intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. The method of making a heating element, comprising: applying to a heat resistant base a fired vitreous ceramic first coating; applying over said first coating a vitreous ceramic second coating containing a reducible metal compound of a metal that is solid at the temperatures to which said element is subjected and a reducing agent; and firing said second coating at a temperature sufficient to fuse the ceramic of the second coating and activate said reducing agent, the metal compound thereupon being reduced to electrically conducting metal particles in contact with each other and dispersed throughout said fused ceramic of said second coating.

2. The method of claim 1 wherein said metal compound is present in an amount of 35 to 70% and said reducing agent in an amount of 2 to 25%, both by weight of said second coating prior to firing.

3. The method of claim 1 wherein there is applied over said second coating a fired vitreous ceramic protective coating.

4. The method of claim 3 wherein said protective coating is limited in extent to leave exposed a pair of spaced areas of said metal containing second coating for attaching electric leads thereto.

5. The method of claim 4 wherein said second coating comprises an elongated strip with said pair of spaced areas located at the opposite ends of said strip, the strip being arranged in a tortuous path with respect to the base on which it is mounted.

6. The method of claim 1 wherein the metal compound containing in said second coating is not electrically conducting prior to being reduced by said reducing agent.

7. The method of claim 6 wherein the metal compound is a silver oxide compound.

8. The method of claim 1 wherein said second coating contains silver oxide and copper oxide.

9. The method of claim 1 wherein said second coating contains silver oxide, nickel and chromium.

10. The method of claim 1 wherein the reducing agent does not give off gas during the firing of said second coating.

11. The method of making a heating element, comprising: applying to a heat resistant base a fired vitreous ceramic first coating; applying over said first coating a vitreous ceramic second coating containing dispersed throughout a finely divided metal that is solid at the temperatures to which said element is subjected and a reducing agent; and firing said second coating at a temperature sufficient to fuse the ceramic of the second coating and activate said reducing agent thereby to prevent oxidation of the metal, the metal thereupon forming throughout said second coating a network of electrically conducting metal particles in contact with each other.

12. The method of claim 11 wherein said second coating contains nickel powder.

References Cited

UNITED STATES PATENTS

| | | | |
|---|---|---|---|
| 2,859,321 | 11/1958 | Garaway | 338—255 |
| 3,573,229 | 3/1971 | Herbst et al. | 252—514 |
| 1,881,446 | 10/1932 | Flanzer | 219—543 X |
| 2,374,527 | 4/1945 | Earle | 338—223 X |
| 3,434,877 | 3/1969 | Degenkoll et al. | 117—212 |
| 3,274,669 | 9/1966 | Place, Sr. | 338—308 X |
| 3,343,985 | 9/1967 | Vickery | 117—227 |
| 3,349,722 | 10/1967 | Davis | 219—543 X |
| 3,386,165 | 6/1968 | Bruhl, Jr. et al. | 29—621 |
| 3,434,877 | 3/1969 | Degenkoll et al. | 117—212 |

VOLODYMYR Y. MAYEWSKY, Primary Examiner

U.S. Cl. X.R.

117—217, 227; 29—611, 621, 543, 544; 252—514; 338—255, 309